United States Patent [19]

Sakaguchi

[11] Patent Number: 4,951,033
[45] Date of Patent: Aug. 21, 1990

[54] INPUT DEVICE OF CHARACTER DATA

[75] Inventor: Yasunori Sakaguchi, Kyoto, Japan

[73] Assignee: Murata Giken Kabushika Kaisha, Kyoto, Japan

[21] Appl. No.: 56,255

[22] Filed: May 26, 1987

Related U.S. Application Data

[63] Continuation of Ser. No. 635,288, Jul. 27, 1984, abandoned.

[30] Foreign Application Priority Data

Jul. 30, 1983 [JP] Japan .................................. 58-140203

[51] Int. Cl.$^5$ .............................................. G09G 5/00
[52] U.S. Cl. .................................. 340/706; 340/712; 340/815.19
[58] Field of Search ........ 340/706, 709, 712, 365 VL, 340/825.19; 400/87

[56] References Cited

U.S. PATENT DOCUMENTS

| | | | |
|---|---|---|---|
| 3,771,156 | 11/1973 | Watts et al. .................. | 340/365 VL |
| 3,798,599 | 3/1974 | Kafafian ........................ | 340/825.19 |
| 3,831,147 | 8/1974 | Kafafian ........................ | 400/87 |
| 4,048,439 | 9/1977 | Gabus ............................ | 340/365 R |
| 4,193,119 | 3/1980 | Arase et al. .................... | 340/712 |
| 4,241,521 | 12/1980 | Dufresne ...................... | 340/825.19 |
| 4,333,097 | 6/1982 | Buric et al. .................... | 340/365 R |
| 4,385,291 | 5/1983 | Piguet .......................... | 340/365 VL |
| 4,406,998 | 9/1983 | Willough ...................... | 340/825.19 |
| 4,458,238 | 7/1984 | Learn ............................ | 340/365 R |

FOREIGN PATENT DOCUMENTS 2145257  3/1985  United Kingdom ........... 340/825.19

Primary Examiner—Jeffery A. Brier
Attorney, Agent, or Firm—Spensley Horn Jubas & Lubitz

[57] ABSTRACT

An input device of character data, wherein a number of character groups to be inputted are stored in a character generating means, which receives address assignment and output corresponding characters to the address in sequence as pattern signals. The character displayed on a display is inputted using a cursor.

3 Claims, 4 Drawing Sheets

FIG. 3

| | G1 | G2 | G3 | | | Gn | | | | | | G9 | G20 |
|---|---|---|---|---|---|---|---|---|---|---|---|---|---|
| 1 | a | i | q | y | | | | | | | | | S |
| 2 | b | j | r | z | | | | | | | | | T |
| 3 | c | k | s | | | | | | | | | M | U |
| 4 | d | l | t | | | | | | | | | N | V |
| 5 | e | m | u | | | | | | | | | O | W |
| 6 | f | n | v | | | | | | | | H | P | X |
| 7 | g | o | w | | | | | | | | I | Q | Y |
| 8 | h | p | x | | | | | | | | J | R | Z |

↑
CURSOR ADDRESS

INPUT DEVICE OF CHARACTER DATA

This is a continuation of application Ser. No. 06/635,288 filed on July 27, 1984 now abandoned.

BACKGROUND OF THE INVENTION

1. Field of the Invention

The present invention relates to input devices of character data, and more specifically to an input device of character data in electronic apparatuses of compact or simple type.

2. Prior Art

In various sorts of electronic devices containing a microcomputer therein, it is preferable that the variety of input keys in use be limited to the irreducible minimum necessary. Consequently a method is widely adopted where one key has plural input functions which are properly changed at the input operation state. However, this method has limitations when characters, such as Japanese "kana" characters, Chinese characters or the like, are inputted using a small number of keys. Particularly when the frequency of inputting the characters is relatively small or when the inputted characters may be small in number, a number of keys and complicated operation are not preferable.

SUMMARY OF THE INVENTION

An object of the invention is to provide a device which easily inputs a variety of characters using a small number of keys.

According to the present invention, a number of character groups to be inputted are stored in a character generating means, which receives address assignments and outputs corresponding characters to the address in sequence as a pattern signal. In the present invention, various sorts of characters, numerals, symbols and the like can be easily inputted using a small number of input keys and therefore the invention may be used conveniently in small electronic apparatuses with a small number of keys. Since a character displayed on a display is inputted using a cursor, the invention is advantageous also in that input mistakes are reduced in comparison to conventional input methods using ASCII code.

Other features and advantages of the invention will be apparent from the following description taken in connection with the accompanying drawings.

BRIEF DESCRIPTION OF THE DRAWINGS

FIG. 3 is a diagram illustrating an arrangement of character groups in a memory.

DETAILED DESCRIPTION OF THE INVENTION

Figure 1:
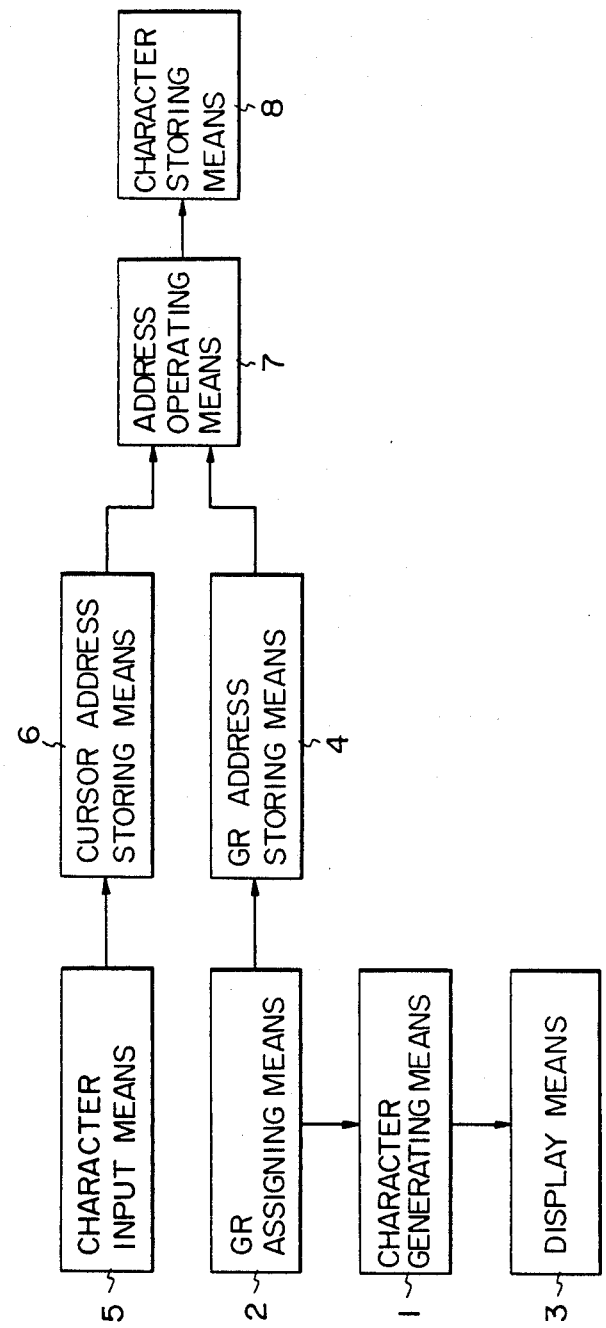
FIG. 1 is a block diagram illustrating an embodiment of the invention.

An embodiment of the invention is shown in FIG. 1. A number of character groups to be inputted in the invention are entirely stored in a character generating means 1, which receives address assignments and outputs corresponding characters to the address in sequence as pattern signals. A group assigning means 2 can selectively assign the character groups per each of plural groups in batch processing. A character group addressed by the group assigning means 2 is read in sequence from the character generating means 1, and a pattern signal thereof is displayed visually on a display means 3 and the address of the assigned group is stored temporarily in a group address storing means 4. Since characters belonging to the assigned group are arranged and displayed on the display means 3, an operator transfers a cursor on the characters using a character input means 5 and selects an intended character and inputs the address thereof to a cursor address storing means 6. The address inputted to the cursor address storing means 6 is the address of the cursor on the display means 3, and an address operating means 7 reads both the address of the cursor and the address of the group in the group address storing means 4 and performs an operation which calculates the character address of the character inputted by the character input means 5 in the character generating means 1 and stores the character address in a character storing means 8. The operator performs the above-mentioned operation repeatedly, thereby a required character can be inputted and, if necessary, character data stored in the character storing means 8 can be read and displayed on the display means 3 or data can be transferred by other means.

Figure 2:
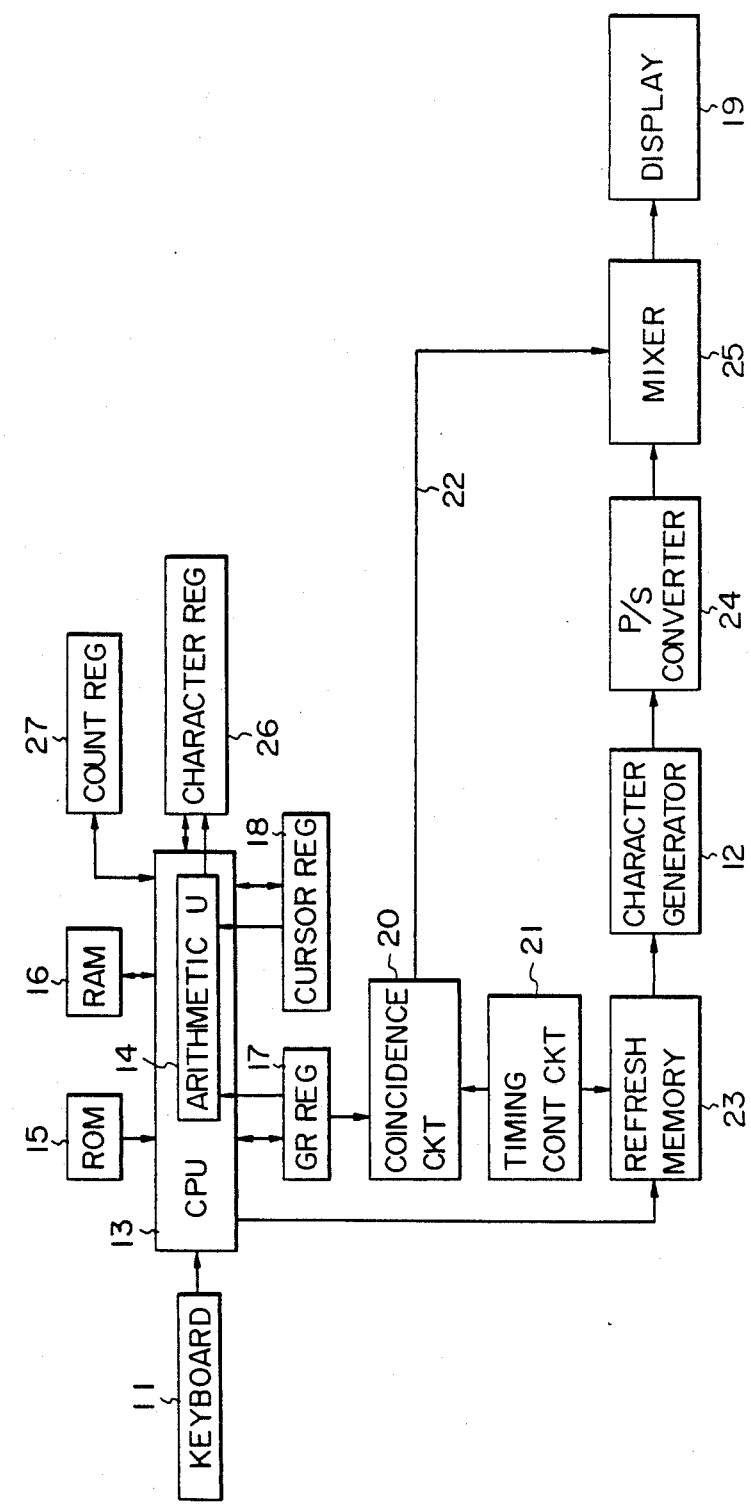
FIG. 2 is a block diagram illustrating an embodiment of the invention.

An embodiment of the invention will now be described. In FIG. 2, a keyboard 11 is provided with an RS key for commanding to start or stop the character data input operation, a GN key for assigning succeeding group, character groups, a GR key for assigning preceding character group, a CN key for transferring the cursor to the left by one, an LS key for character inputting, an LA key for the character correction, and an LD key for character data display. Referring to FIG. 3, characters which can be inputted in the device exist in 160 sorts, including blanks. Each character is addressed and stored in a memory as hereinafter described. The characters are classified into groups (G1)–(G20), each comprising eight characters. The address of each character is determined by the address assigned to each group and the address representing the character position in each group. Reference numeral 12 designates a character generator which stores character groups. The character generator 12 generates the pattern signal of the character corresponding to the address assignment from the keyboard 11. Numeral 13 designated CPU including an arithmetic unit 14. The CPU is connected to peripheral device through an address bus, a data bus and a R/W signal line. Numeral 15 designates ROM which stores control programs of the device, numeral 16 designates RAM used as data memory of the CPU, and numeral 17 designates a group register to store address of the character group. Numeral 18 designates a cursor register to store the address of the cursor on a display 19 as hereinafter described. The group register 17 is counted by the RS key, the GN key and the GR key on the keyboard 11; the cursor register 18 is counted by the RS key, the CN key and the CR key. The output of the group register 17 is supplied to a coincidence circuit 20 where the coincidence of the output of the group register 17 and the timing pulse of a timing control circuit 21 for specifying the dot number on the display 19 is taken. When both are coincident a cursor display signal 22 is generated. A refresh memory 23 addresses the succeeding character generator 12 corresponding to the timing pulse of the assigned character. The pattern signal from the character generator 12 is supplied to a parallel/series converter 24 and converted into a serial video signal, and then displayed visually on the display 19 through a mixer 25. Each address stored in the group register 17 and the cursor register 18 is read by the LS key on the keyboard 11 and processed in the arithmetic unit 14 and then stored in a character register 26 as a character address to assign specified characters among the character groups. A count register 27 counts the character data number stored in the character register 26. The LD key serves as an input key to read the character address in the character register 26 and display it on the display 19, and the LA key is used to erase part of the displayed character data from the character register 26.

Figure 4:
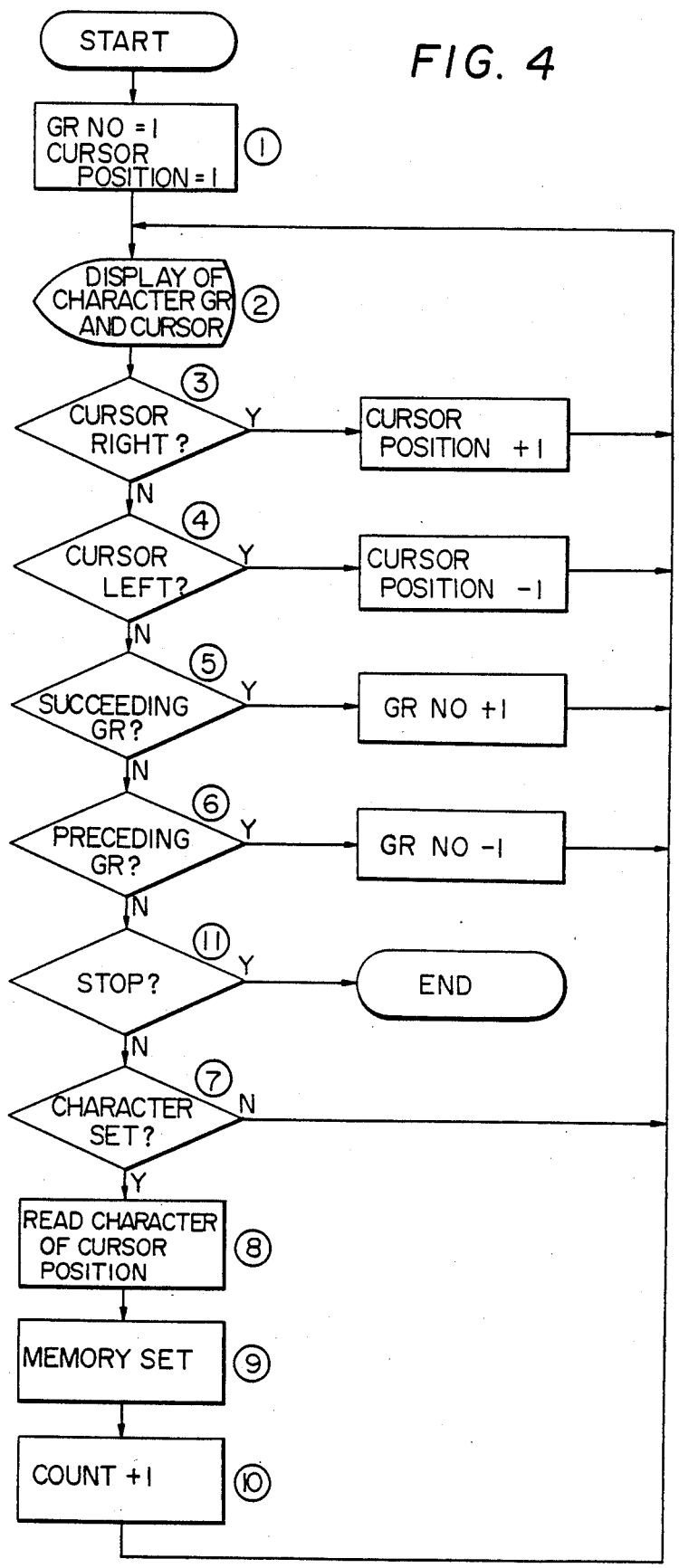
FIG. 4 is a flow chart illustrating the operation of an embodiment of the invention.

Operation of the device will now be described referring to a flow chart shown in FIG. 4.

In step ①, each memory group as above described is reset by the RS key input, and the group register 17 and the cursor register 18 are set to "1" and the counter register 27 is set to "0". Then value (n) in the group register 17 corresponds to the group (Gn) in FIG. 3.

In step ②, character column "a, b, c, d, e, f, g, h" belonging to the set group (G1) is displayed on the display 19. Then the cursor is displayed on the character "a" based on the content of the cursor register 18.

In step ③, every time the CN key for transferring the cursor to the right is pushed, the cursor is transferred to the right by one character and the value of the cursor register 18 is added by one.

In step ④, every time the CR key is pushed, the cursor is transferred to the left by one character the value of the cursor register 18 is subtracted by one.

In steps ⑤ ⑥, if a required character does not exist in the character column "a, b, c, d, e, f, g, h" on the display 19, the GN key or the GR key is pushed to change the group display. If the GN key is pushed once, succeeding character group (G2) "i, j, k, l, m, n, o, p" is displayed and the group register 17 is set to "2". If the GR key is pushed once, the preceding character group (G20) "N, O, P, Q, R, X, Y, Z" is displayed and the group register 17 is set to "20".

In step ⑦, the operator suitably repeats the operation of steps 3–6, until the cursor is disposed on a required character and the LS key is pushed to input the character.

In step ⑧, each address data is read from the group register 17 and the cursor register 18, and processed by the arithmetric unit 14 in the CPU 13.

In step ⑨, the character address obtained by the above processing is set to the character register 26.

In step ⑩, the value of the count register 27 is added by one and the process is returned again to step 2.

The above-mentioned steps are performed until the required character data is inputted. The steps are finished by pushing the RS key at step ⑪, or stopped if the count register 27 indicates an impossible input.

What is claimed is:

1. An input device of character data, comprising:
   (a) a character generating means for storing a number of character groups and for generating a pattern signal corresponding to said characters in accordance with an assigned address;
   (b) a display means for visually displaying the pattern signal generated by said character generating means, said display means displaying less than all of said character groups at any given time;
   (c) a group assigning means for assigning an address to each of the character groups;
   (d) a group address storing means for storing the address of the group assigned by said group assigning means;
   (e) a character input means for inputting any character among the group displayed by said display means by selectively transferring a cursor to a position adjacent said character;
   (f) a cursor address storing means for storing the address of the cursor during character inputting by said character input means;
   (g) an address operating means for operating on the address stored in the group address storing means and the address stored in the cursor address storing means and calculating the address of the inputted character; and
   (h) a character address storing means for storing the address of the character calculated by said address operating means.

2. A device for inputting character data comprising:
   character generating means for storing characters available for input, said characters being organized into a plurality of groups, each of said groups comprising less than all of the characters available for input;
   display means for displaying one of said plurality of groups;
   first selection means for selecting one of said groups for display by said display means;
   second selection means for selecting one of said characters from said display group;
   input means for inputting a character corresponding to the character selected by the operation of said first and second selection means.

3. An input device for the input of character data into an electronic apparatus, comprising:
   character generating means for storing a number of character groups and for generating a pattern signal for a corresponding character in dependence on an address assignment,
   display means for visually displaying the pattern signal generated by the character generating means,
   character input means for inputting characters selected from among a group of characters displayed by the display means,
   address processing means for ascertaining the addresses assigned to the character groups and individual characters,
   address storage means for storing the addresses which are ascertained by the address processing means,
   group assigning means for addressing a character group to be displayed from among a plurality of character groups,
   group address storage means for storing the address of the character group addressed by the group assigning means,
   cursor guiding means for guiding a cursor on the display means for the input of the characters,
   cursor address storage means for storing the cursor address of a character selected during the character input by the character input means,
   the address processing means operating to process the respective group address stored in the group address storage means and the respective cursor address stored in the cursor address storage means,
   whereby the address of the character to be inputted is determined.

* * * * *